Patented Nov. 17, 1936

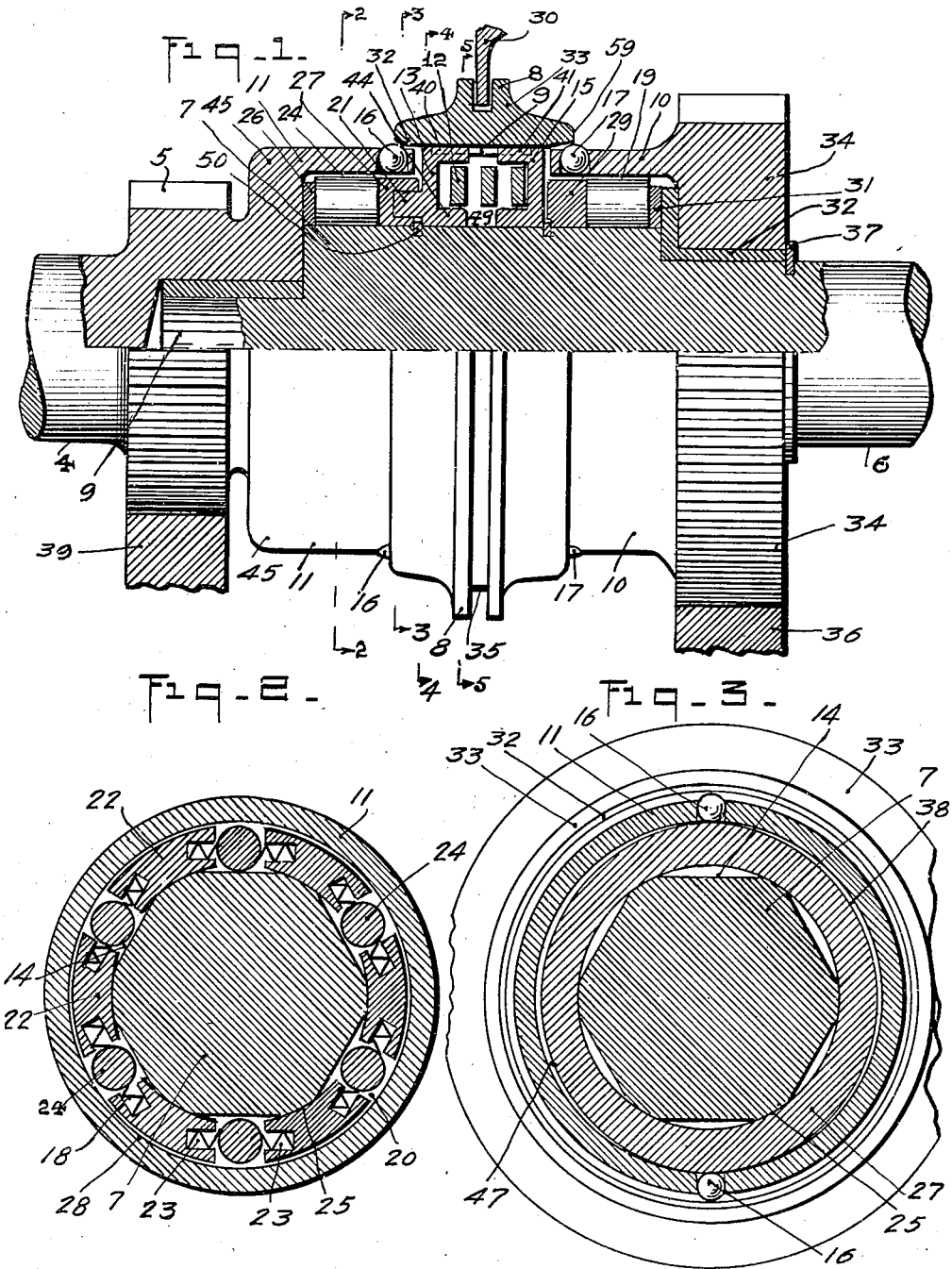

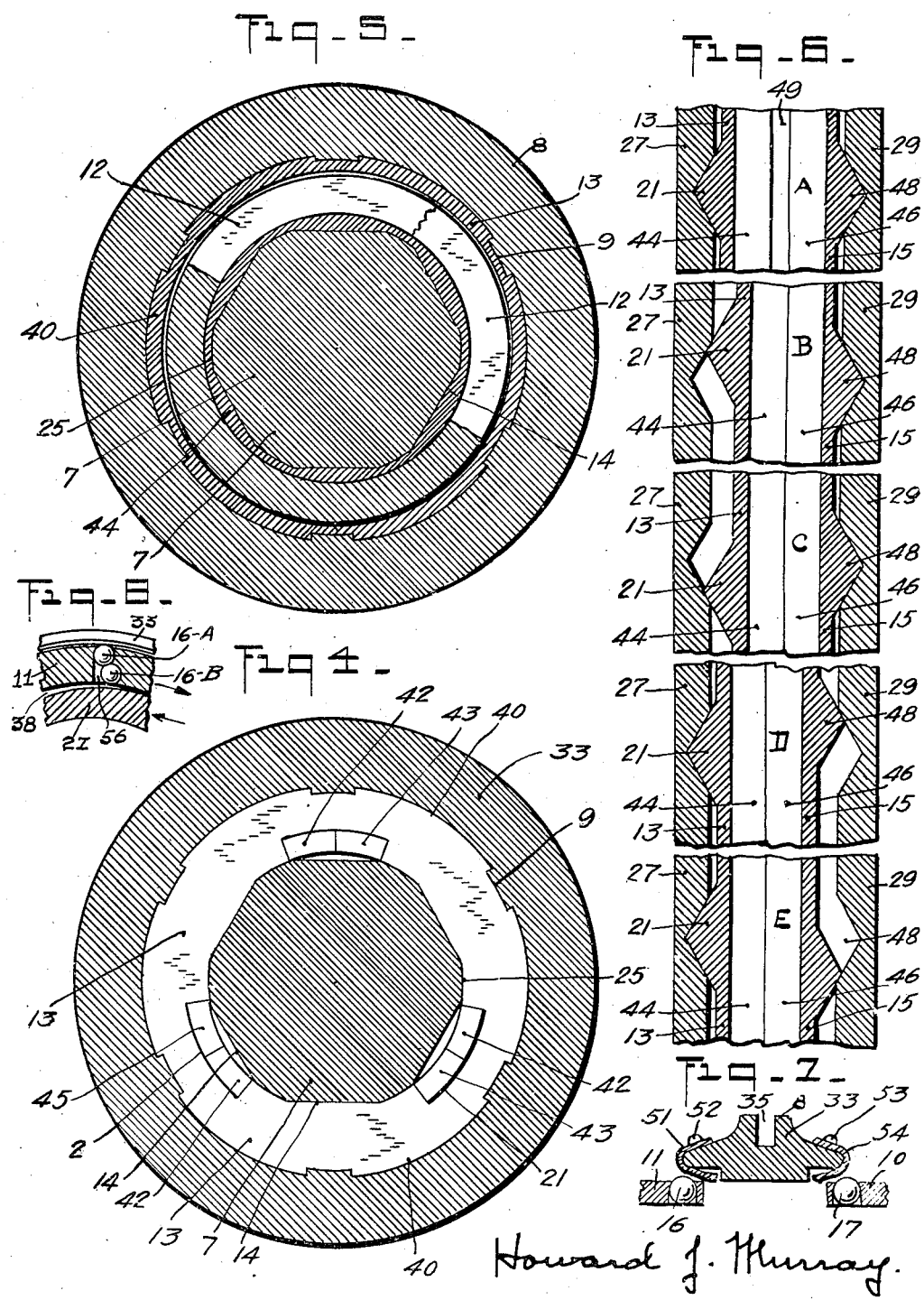

2,061,288

UNITED STATES PATENT OFFICE 2,061,288

SELECTIVELY CONTROLLED TORQUE ACTUATED CLUTCH TRANSMISSION MECHANISM

Howard J. Murray, New York, N. Y.

Application April 8, 1935, Serial No. 15,176

30 Claims. (Cl. 192—48)

My invention relates in general to a simple control device for positively effecting the actions of reversible unidirectional clutching elements selectively employed to effect the power transmitting relations of driving and driven power members.

One of the general objects of my invention is to provide control elements by means of which reversible unidirectional clutching elements with an intermediate fully released position may be selectively actuated whereby a selected driving member may be connected to a driven member by virtue of power derived from the relative rotation of the said driving and driven members.

Another object of my invention is to provide a simple power actuated reversible unidirectional clutch control organization including a control responsive to a relatively light control force for causing the said control to begin to function and additional means for causing the said organization to complete the clutch actuation by virtue of power derived from the relative rotation of certain associated power members.

Still another object of my invention is to provide selective control means designed to effect the positive actuation of reversible unidirectional clutches to and from an operative position wherein the energy for said actuation is obtained from associated power members within the confines of the transmission casing.

A further object of my invention is to provide a roller clutch organization wherein reversible unidirectional declutching action will be automatically effected by camming means actuated by power previously derived from relative rotation of driving and driven members.

An additional object of my invention is to provide a reversible unidirectional clutch control means designed to positively actuate interlocked reversible unidirectional clutches with an intermediate fully released position into and out of clutching position with driving and driven members by opposing the relative rotation of the power members to be clutched.

A still additional object of my invention is to provide a reversible unidirectional clutch organization in which the positive actuation of the clutches into and out of clutching position will be definitely and positively effected by power obtained due to relative rotation of driving and driven members therefrom to tend to cause the members to approach a common speed, and to thereafter impart relative motion between the members to effect declutching action.

A still further object of my invention is to provide means whereby roller clutches can be selectively controlled to become reversible unidirectional roller clutches with an intermediate fully released position due to the selective remote control of elements designed to obtain roller control power from the relative rotation of the associated driving and driven members.

The present invention is a development of the invention disclosed in my U. S. patent application Serial No. 590,852 filed February 4, 1932, and my U. S. patent application Serial No. 540,288 filed May 27, 1931, which applications have matured into Patents 2,051,386 and 2,051,385, respectively.

The present disclosure provides means for positive declutching action by varying the speed of one of the members relative to the common driving speed by power derived from the members previous to the clutching relation. The declutching action therefore does not depend on the variation of the power supplied to the transmission. According to the present disclosure the positive actuation of the clutch-rollers into and out of a clutching position is accomplished by providing means arranged to obtain power by virtue of the relative rotation of the power members. In one embodiment of the present invention this power is obtained during the selective movement of the clutch-rollers toward a clutching position, thence automatically held in suppression during the normal driving relation of the power members, and finally released to effect the declutching action.

As the power for positive clutch actuation is derived from the inherent power represented by the relative rotation of the driving and driven members, it is obvious that the derivation of this clutch actuating power tends to decrease proportionally the relative rotation of the driving and driven members and, thereby causes the said members to approach a common speed prior to a driving relation.

The present disclosure thus provides means for positively controlling the movement of the rollers into clutching engagement with the driving and driven members so that the noise and shock usually accompanying clutch roller action in clutch devices as now known is eliminated.

It is obvious that in order to positively effect declutching action of reversible unidirectional clutches under all conditions of operation that the declutching action will require power sufficient to rotate the clutched members relative to each other.

As this clutch actuating power is derived by virtue of the relative rotation of the driving and driven members during the movement of the clutch rollers towards a clutching position, it is obvious that the derivation of this power will act to bring the driving and driven members to a common speed. With proper design, it will be possible to bring the driving and driven members to a synchronous speed before the rollers move to a clutching position. Thus the driving and driven members are placed in driving relation by means energized by power derived from the relative rotation of the said members.

In the following description names will be given to parts for convenience of expression, but the names are intended to be as generic in their application to similar parts as the art will permit.

The invention allows numerous physical embodiments and a preferred type is herein illustrated for the purpose of showing an application of the invention, but it is hereby understood that the showings in the drawings are largely diagrammatic merely being sufficient in detail to show applications of the invention.

In the drawings:

Figure 1 is a fragmentary view of part of a power transmission equipped with a selective control organization, and a torque actuated reversible unidirectional clutch means having inventive features as disclosed in this application.

Figure 2 is a transverse sectional view taken along the line 2—2 of Figure 1 in the direction as indicated by the arrows.

Figure 3 is a transverse sectional view taken along the line 3—3 of Figure 1 in the direction as indicated by the arrows.

Figure 4 is a transverse sectional view taken along the line 4—4 of Figure 1 in the direction as indicated by the arrows.

Figure 5 is a transverse sectional view taken along the line 5—5 of Figure 1 in the direction as indicated by the arrows.

Figure 6 is a sectional view showing five positions of the interlocked cams and indicates the means for preventing the simultaneous actuation of both sets of clutch rollers.

Figure 7 is a sectional view in elevation showing a modification of the axially slidable selective control means shown in Figure 1 so as to provide a slip-clutch or give-away connection.

Figure 8 is a view in sectional elevation indicating a modification of the selective control means of Figure 1 whereby unidirectional actuation of the clutch rollers is effected in one direction as indicated by the arrows.

The present disclosures relates to a selective speed power transmission mechanism including driving and driven members in which I have brought together in a simple manner in, combination with positively controlled reversible unidirectional clutches with an intermediate fully released position, a selective control means, a self-energized actuating means for positively and definitely moving the said reversible unidirectional clutches to and from operating positions for quietly effecting desired speed relations between the driving and driven members through the agency of the said clutches, said selective control and said self-energized actuating means.

Referring to the drawings, there is shown in Figure 1 a normally driving power shaft 4 connected to a suitable source of power supply, such as an internal combustion engine as commonly found on automotive vehicles (not shown).

A shaft 6 hereinafter designated as the normally driven member of the transmission is connected to drive the wheels of the said vehicle.

The shafts 4 and 6 preferably are positioned in axial alignment by means of the bearings 9 suitably positioned in a recess in the shaft 4.

For the purpose of this description, the means shown by Figure 1 may be considered as a fragmentary portion of a selective form of speed transmission with the parts necessary to effect low and reverse speeds omitted and with various other parts of the interlock and countershaft also omitted in order to simplify the drawings.

In the same manner the shift lever and associated parts as well as the means for connecting the shift rods to same are not shown. According to the present invention it is intended to use any known selective actuating means to move the shift rods (not shown).

In general it may be assumed that the means shown in Figure 1 are primarily for the purpose of selectively placing the transmission in a so-called direct or second speed status. The gear 39 is shown constantly in mesh with the engine gear 5, and the gear 36 is indicated as being constantly in mesh with the loosely mounted power gear 34, and the gears 36 and 39 are assumed to be portions of a counter-shaft cluster (not shown).

The normally driven shaft 6 is assumed to be connected to a conventional propeller shaft through a conventional universal joint and is formed with an enlarged portion 7 provided with a plurality of clutching surfaces 14 as shown by Figures 2, 3, 4 and 5.

The clutching surfaces 14 in the present disclosure are formed by grinding away 6 sections of a round shaft so as to form a plurality of surfaces symmetrical about the axis of the shaft 6, but it is obvious that the number and form of the surfaces may be varied to suit the conditions under which the device may be installed and operated.

In any event the surfaces are intended to position two sets of reversible unidirectional clutch-roller elements 19 and 24 housed within the outlines of the flanged portion 11 of the engine gear 5 and the flanged portion 10 of the gear 34. The clutch-rollers 19 and 24 may be considered as consisting of a plurality of sets of reversible unidirectional rollers in the form of solid steel cylinders designed to selectively engage the inner driving surfaces of the projecting portions 10 and 11 when moved relative to the radially varying surfaces of the enlarged portion 7 of the driven member 6 so that one may be driven from the other according to the operative status of the said rollers.

The clutch rollers 24 are formed so that the projection 11 of the engine gear 5 may selectively drive the power member 6 in a clock-wise direction, or the member 6 may drive the projection 11 in a clock-wise direction as viewed from the left hand end of Fig. 1. In the same manner the set of rollers 19 will drive the member 6 from the projection 10 in a clock-wise direction, and the member 10 from the member 6 in a clock-wise direction as viewed from the left hand end of Figure 1.

It should be noted that the projection 11 is integral with the engine gear 5, and that the projecting portion 10 is formed integral with the loosely mounted gear 34. Thus the portion 11 will rotate at the speed of the engine shaft 4, and the portion 10 will rotate with the gear 34.

All of the clutch rollers 19 and 24 forming the clutches are normally held in the intermediate fully released position shown by Figure 2 by centering springs 18 designed to normally hold the rollers symmetrically in the openings 20 formed between the actuating elements 22 provided with recesses 23 shaped to receive and position the springs 18. The actuators 22 are symmetrically positioned about the shaft portion 7 to rotate on the curved portions 25, and are securely attached in a suitable manner to the end rings 26 and 27 to rotate therewith.

The actuators 22 and the end rings 26 and 27 are formed to move within the space between the shaft portion 7 and the projection 11, and the rollers 19 and associated end rings 29 and 31 are movable within the space formed between the shaft portion 7 and the projection 10.

The ring shaped members 27 and 29 are formed with servo-cam recesses to receive mating cam projections 21 and 48 (see Figure 6) formed on the axially slidable elements 13 and 15 fitted to the surfaces 14 so as to rotate at all times with the enlarged portion 7. The driving projection 11 is formed with an opening to receive and restrain for radial movement a control member 16 indicated by the steel ball 16 of Figure 3. These balls 16 are positioned in the path of the cammed surface 32 formed on the left hand end of the axially slidable control member 33 arranged to receive a shift finger 30 in the slot 35 between the flanges 8. Variable radius slots 38 and 47 formed in the actuating ring 27 are positioned directly beneath the balls 16 and in their path of movement. Similar balls 17 are positioned in the projection 10, and similar variable radius slots are formed in the actuating ring member 29. The elements 13 and 15 are formed with splines 40 and 41 to fit mating splines 9 shaped on the axially slidable member 33 so that the members 13, 15 and 33 may move relative to each other axially as they rotate with the shaft portion 7. A flanged projection 44 is formed on the element 13 so as to provide a wide bearing on the surfaces 14.

A similar flanged projection is formed on the axially slidable member 15. This projection 46 (see Figure 6) is spaced axially from the projection 44 to provide a neutral non-operating axial clearance 49. The cams 21 projecting from the member 13 are shaped with cam faces 42 and 43 designed with a desired included angle. The cams 21 of the member 13 are assumed to be rotated about the axis of the shaft portion 7 through an angle of 60 degrees relative to the cams 48 of the member 15.

A coiled spring 12 (see Figures 1 and 5) is positioned between the axially slidable members 13 and 15 and coiled about the portion 7 of the shaft 6. The spring is supported on the flanged extensions 44 and 46. As the spring is extended the members are axially fixed by the split rings 50 so positioned on the portion 7 as to permit the installation and removal of the members 13 and 15 when the spring 12 is properly compressed.

Figure 6 includes 5 sectional sketches designated as A, B, C, D and E showing the action of the clutch roller interlocking means as well as the relations of the cams 21 and 48. Sketch A indicates the relative position of the parts with the shift fork 30 in the position shown by Figure 1. Sketch B indicates the position of the cams and associated parts as the projection 11 drives the portion 7. Sketch C indicates the position of the parts as the member 7 drives the portion 11. It should be noted that the space 49 is now occupied by the flange portion 44. This is also true for sketch B. Sketch D indicates the position of the parts as the projection 10 drives the portion 7, and sketch E indicates the positions as the portion 7 drives the projection 10.

The operation of the device is described as follows.

If the vehicle upon which the transmission is installed is in motion, the power member 6 is thus rotated by the rear wheels, and thereby the shaft portion 7 and the elements of Figure 1 including the rollers 19 and 24, cammed members 27, 29, 13 and 15, spring 12, and axially slidable member 33 will rotate with the shaft 6. If the vehicle is at rest the shaft 6 and the parts arranged to rotate with it are at rest.

If the engine of the vehicle is running the conventional clutch (not shown) may be employed to rotate the engine shaft 4 and the associated parts including the gear train 5, 39, 36 and 34 and thereby the hub extensions 10 and 11 and also the control balls 16 and 17 carried thereby.

If either the engine or vehicle (or both) are in motion the hub extensions 10 and 11 and the roller sets 19 and 24 may relatively rotate about the common axis of the shaft portion 7.

Let it now be assumed that the vehicle or engine (or both) are moving and that the operator of the vehicle desires to place the transmission in intermediate speed. In this event (and with the transmission in neutral) the operator moves the shift finger 30 to the right and thereby the axially slidable member 33 to the right. Such movement brings the cammed surface of the end portion 59 into contact with the control balls 17 moving with the driving projection 10 forming an integral portion of the intermediate driving gear 34 connected by gear train including jack-shaft gears 36 and 39 to the driving shaft 4. Continued axial movement of the member 33 to the right results in an over-riding action of the camming surface of the end portion 59 to radially depress the control balls 17 downward along their openings in the portion 10.

The roller actuating and cammed member 29 shown directly in the path of the balls 17 is provided with one or more cammed tracks 38 and 47 (similar to the cammed tracks 38 and 47 of member 27 of Figure 3). The axial movement of the shift finger 30 is thereby transmitted to the balls 17 to hold them radially inward so that the relative movement of the members 10 and 29 will cause a clutching engagement between the balls 17 and the member 29 due to the reaction against the cammed tracks 38 and 47. Thus there is provided a force resolving organization whereby a relatively slight force initially applied to the slidable member 33 inaugurates a relatively large clutching force between the driving member 4 and the driven member 6. But the cammed element 29 is connected to the resiliently held mating cammed member 15 mounted for rotation with the driven member 6 as it moves axially. Thus as the member 29 is clutched to the member 10 to tend to rotate with the driving member 4 the member 15 continues to rotate with the driven member 6. The members 29 and 15 thus tend to rotate relative to each other, and because of the cammed connection due to the mating cams 48 a relative axial movement must accompany said relative rotary movement.

But any axial movement of the member 15 will be resisted by the spring 12 to the extent of its resisting ability. If the axial resultant of the cam action between the members 29 and 15 is greater than the resistance of the member 12 the member 15 will be moved axially to the left thus permitting relative rotary movement between the members 15 and 29 and thereby a relative movement between the members 4 and 6, and also a relative movement between the rollers 19 and the shaft portion 7 of the shaft 6. With the rollers displaced from the position shown in Figure 1, it is evident that power has been stored in the spring 12.

The clutching action of the balls 17 and the cammed tracks 38 and 47 of the member 29 is progressive and is completed by the inherent power represented by the difference of speed of the members 10 and 29. It is evident that the resultant forces reacting to push the balls 17 radially outward in turn produce an axial component force tending to move the axially slidable member 33 to the left, but it is obvious that this axial force applied to the member 33 may be caused to be very small compared to the reaction between the balls 17 and the cammed surface of the portion 59 by proper design.

The gripping of the member 29 by the balls 17 results in relative axial movement of the cammed member 15 and also causes relative rotary movement of the members 15 and 29 and thus the rollers 19 are also moved from the inoperative position shown in Figure 1 relative to the shaft portion 7 so as to rotate relatively clock-wise. As the camming action of the cams 48 between the members 15 and 29 continues the spring 12 is being compressed and the rollers 19 are being positively moved toward a positive clutching position between the power members 10 and 6. The power for causing this camming action and compressing the spring is derived from the relative rotation of the members 10 and 6, and thus the driving member 4 and the driven member 6. Power is thus transmitted between the driving and driven members 4 and 6 to cause the members 4 and 6 to approcah a common speed. If the spring 12 is properly designed this transfer of power may be accumulative and regenerative due to the reaction between the cam surfaces of the members 15 and 29. When the common resilient element 12 is provided with sufficient resistance against compression, it is obvious that power may be transmitted between the members 4 and 6 before the clutch rollers 19 and 24 have been relatively moved into clutching position with the members 10 and 11. In this event the driving and driven members 4 and 6 would be in resilient driving relation, and the clutch rollers 19 and 24 would in effect float between the intermediate fully released position and the clutching positions according to the extent and direction of the driving torque between the members 4 and 6.

If the said torque becomes relatively excessive, then the spring 12 will be sufficiently compressed by the force resolving action of the cams to permit the driving member to move the clutch rollers into a positive drive clutching position.

Thus in normal operation for a selected speed, the members 4 and 6 would be in a resilient drive relation, and would automatically move themselves into a positive drive relation during intervals of excessive torque relations.

Thus the camming means of Figure 1 is torque-actuated when an initial axial force is applied to the shiftable member 33, but the initial force does not have to be maintained to sustain the said state of torque-actuation. It is true that the shiftable member 33 has to be axially positioned to continue to depress the balls 17, but its position is maintained by the conventional interlock (not shown) and no axial force is necessary.

Now let it be assumed that the resistance spring 12 is provided so as to have sufficient resistance strength for the conditions under which the transmission will be installed and operated. In any event the initial operation of the shift finger to the right will result in a transfer of power from one member (4 or 6) to the other and to the spring 12 to cause the members 4 and 6 to approach the same speed as the rollers 19 tend to move toward a clutching position whereby one of the members may positively drive the other power member (see members 4 and 6, Figure 1).

Thus the member 10 will be positively connected to the driven member 6 with sufficient relative movement of the rollers 19 to positively drive the member 6 in a clock-wise direction as viewed from the left hand end of Figure 1. In the same manner the power member 6 will be connected to the member 10 to drive the same in a clock-wise direction as viewed from the left hand end of Figure 1.

It should be noted that the change of driving relations between the members 10 and 6 is automatic as long as the axially shiftable member 33 is in an operative position as will be seen by reference to sketches A, B, C, D, and E of Figure 6. Sketch A indicates the relations of the members 4 and 6 when the axially slidable member 33 is in a neutral position and with the cammed surfaces of the members 21, 27, 29 and 48 fully seated.

Sketch D indicates the relations of the cammed members when the projection 10 is driving the member portion 7, and sketch E of Figure 6 indicates the position of the cammed members 15 and 29 when the normally driven portion 7 is driving the projection 10.

In actual operation of a vehicle the members 4 and 6 may either become the driving member and thus the direction of power transmission constantly changes. As the projection 10 drives the member 6 and then the member 6 drives the member 10, it is obvious that as the member 6 tends to rotate faster than the member 10 with the cams in the position as shown by sketch D of Figure 6 the necessary torque required to hold the cammed projections 48 in the position shown no longer exists and the energy stored up in the spring 12 will act to positively move the rollers 19 to the position shown in Figure 2, and the cams to the position shown by sketch A of Figure 6. It should be noted at this time that the space 49 between the flanged projections 44 and 46 of the members 13 and 15 is approximately taken up as the member 15 is moved to the left as shown in sketch D. As the member 6 now exceeds the speed of the projection 10 the cams will be seated as in sketch A and thence immediately moved to the position as shown by sketch E. Thus the opening 49 will be closed again. As the cams move to and from the positions shown by sketches D and E the member 13 cannot be moved to the right during the clutching action of the rollers 19 and the danger of simultaneous clutching of the sets of rollers 19 and 24 is definitely and positively eliminated.

Hence according to the present disclosure I provide an automatic interlock between the said sets of reversible unidirectional rollers 19 and 24. Still further it should be noted that in the event of axial movement of both members 13 and 15 toward each other, that the space 49 will be jointly occupied and the flanges 44 and 46 will intercept each other before either of the sets of rollers 19 and 24 may be moved to a clutching position with the power members.

This action of changing the driving and driven relations of the power members 10 and 6 is an automatic function of the torque relations of the members 10 and 6 and occurs without any change of status of the control elements 30, 33 and 17 except the change in direction of the force resolutions between the balls 17 and the member 29.

Conditions of operation can exist, however, wherein the member 10 is driven from the member 6 and it is desired to move the rollers 19 and thus the member 29 from a clutching position as shown by sketch E of Figure 6 to the neutral position shown by sketch A. With the conventional clutch (not shown) connected to the driving member 4 "out" it is obvious that the tendency of the member 10 is to decelerate and thus continue to be driven by the member 6 as long as member 6 has rotation. In this event it becomes necessary to provide for the declutching of the rollers 19 with the members 10 and 6. But the member 10 must be placed in a state of tendency to rotate faster than the member 6 in order to free the rollers 19 or the rollers 19 must be provided with a sufficient torque to positively move the rollers from the said clutching position. In order for the servo-cams of members 15 and 29 and thus the rollers 19 to be first moved to a clutching position it is first necessary to compress the spring member 12 from the position shown in sketch A of Figure 6. The power acquired by the spring during compression remains stored up in the spring during the clutching action of the rollers 19. This stored power is assumed for the purpose of this description to be of sufficient magnitude to move the clutch rollers 19 from a clutching position (the conventional clutch remaining "out").

When the member 10 is connected to the engine of the vehicle with the member 6 still remaining the driving member, it is obvious that the spring could not practically accelerate the member 10 with respect to the speed of the member 6.

The approximate maintenance of speed of the member 10 under the driving conditions indicated by sketch E of Figure 6 with respect to the member 6 will be insured by the torque transmitted through the rollers 19, that is, the speed of the member 10 cannot become less than the speed of the member 6. Thus the only requirement of the torque producing ability of the compressed spring 12 acting through the servo-cams 48 of the members 15 and 29 is that the spring impart an infinitesimal acceleration or tendency to acceleration of the member 10 and/or be able to positively move the clutch rollers 19 from a clutching position.

The form of the spring 12 is immaterial, as well as its direction of movement. The only requirement is its ability to receive and store power from the power members, and then to return this power to aid in declutching the rollers 19 and 24. The spring 12 may be made so as to taper from the center to the ends so that the resistance will increase as it is compressed, and correspondingly decrease as it expands. Still further the cams 21 may be so formed as to require greater forces while compressing the spring than is subsequently returned by the spring to the members 27 and 29. It is obvious that the cam angles of the surfaces shown by Figure 4 may be varied to produce an unlimited series of combinations of axial and transverse components.

According to the present disclosure, the spring 12 may be relatively so strong as to always bring the driving member 10 and the driven member 6 to a driving relation before the rollers 19 are moved into a clutching relation, or the roller clutches 19 and 24 will not be moved to a clutching position except during periods of excessive driving torque relations between the member 6 and the member 10 or 11. In this event the rollers 19 would more or less float between a neutral position and a clutching position as the members 10 and 6 are moving together at approximately synchronous speed.

Normally as long as the conventional clutch between the engine (not shown) and the member 10 is held "out", this floating action will continue. If now this conventional clutch is let "in" the member 10 will acquire a comparatively great torque, and the rollers 19 will be moved to a clutching position. The actual clutching position of the rollers 19 and 24 will depend on the directional relative rotation of the members 10 and 6, that is, whether the vehicle is to drive the engine, or the engine drive the vehicle. In either event sufficient torque may now be obtained from the members 10 and/or 6 to operate the cams 21 against the spring 12 to compress it still farther from its initial compressed position to positively move the rollers 19 into a clutching position. Such action will start at the instant of change from a balanced resilient relation between the power members 10 and 6 and the rollers 19 will be moved to assume the clutching action without jar or shock. Of course, all degrees of synchronism are possible with proper design of cams and spring. The spring 12 may be only of sufficient strength to partially synchronize the members, before the rollers 19 are moved into clutching position. But, whatever the degree, the relative speed of the members 10 and 6 will be decreased to correspondingly decrease the jar and shock of the clutching action of the rollers 19.

Now let it be assumed that the operator of the vehicle wishes to change the transmission from intermediate speed to direct drive. In this event the operator moves the shiftable element 33 from the extreme right to the left, passing through the neutral position shown in Figure 1. The inclined surface of the portion 59 moves also to the left releasing the control balls 17 from clutching relation with the cammed track portions of the member 29.

Whatever the position of the clutch rollers 19 may be at this instant of freeing the control balls 17, it is evident that the spring 12 will tend to return the clutch rollers to, or retard the clutch rollers 19 in, the position shown in Figure 2.

As the shiftable member 33 is moved to the left from neutral position the camming surface of the portion 32 will now move the control balls 16 radially inward to grip the balls with the cammed track portions 38 and 47 (see Figure 3) and thereby clutch the flanged portion 11 of the driving gear 5 with the cammed element 27. The portion 11 now tends to drag the portion 27 with it as also does the cammed portion 13 in the same manner as hereinbefore described for the reactions of members 10, 29 and 15. The cams 75

21 (see Figure 4) provided with the surfaces 42 and 43 will react with the camming surfaces of the portion 27 to cause axial movement of the member 13 to the right and at the same time a relative rotary movement of the rollers 24 (see Figure 2) with the shaft portion 7 according to the relative movement of the driving member 11 and the driven member 6.

With a sufficiently powerful spring 12 the power members 11 and 6 will be caused to approach the same speed before they are placed in positive drive relation, by the power derived from the relative clock-wise or counter clockwise movement of the members 11 and 6.

The spring 12 is employed as a common torque actuated synchronizing means to selectively bring the members 10 and 6 or 11 and 6 to the same speed. The spring also acts bidirectionally. The same spring 12 when actuated by stored up power derived from the members 4 and 6 is commonly employed to bidirectionally and positively release the members 10 and 6 or 11 and 6 from a driving relation. The releasing action may occur automatically or by manual selection. A rapid change is possible from one set of speed driving relations to another.

This rapid change may be made with a small initial force applied to the shift fork 30, and a return of the shiftable member 30 is possible without reference to the instantaneous torque relations of the power members 4 and 6.

Figure 1 indicates a form of torque synchronizer in which driving and driven members 11 and 6, and 10 and 6 are caused to assume the same speed through the agency of a resilient resisting member 12, the power for actuating the said member 12 being derived from the driving and driven members to be synchronized. The power for overcoming the resisting member 12 is attained by causing either or both of the said power members to transfer power from one to the other. In Figure 1 the cammed member 27 is placed into operative relation with the member 11 immediately upon the application of the manual or other inaugurating force applied to axially move the shift fork 30. Under some circumstances, such as for instance, where the members 11 and 6 are moving at high relative speed and when one or both members 4 and 6 are turning with strong torque forces, the rotating cams 21 and thus the members 27 and 13 will tend to impose a strain on the parts not necessary to the proper synchronization of the driving and driven members.

Accordingly there is indicated by Figure 7 a modified form of control which retains all of the advantages inherent in the structure included in the means of Figure 1, and which at the same time provides for some flexibility in the camming engagement. It is obvious that the greater the relative torque force between the driving and driven members the greater is the amount of work or transfer of power necessary to overcome this power and to deprive the driving and driven members of their relative speed.

The modification as indicated by Figure 7 provides give-away means 51 and 54 in the form of annular springs secured to the axially slidable member 33 by means of fasteners 52 and 53. With the member 33 moved to the extreme left the spring 51 maintains the balls 16 capable of engagement with the cammed member 27, but at the same time permits the balls 16 to automatically and intermittently move to an operative position with respect to the cammed tracks 38 and 47 (see Figure 3) of the cammed member 27 until a period of time has elapsed sufficient to decrease the relative speeds of the member 11 and member 7 thereby to permit complete and continuous operation of the cams of the members 13 and 27 to bring the normally driving member 11 and the driven member 7 to a common speed. The continuous operation of the balls starts as an automatic function of the torque relations of the driving member 11 and the driven member 7, and/or the resisting qualities of the give-away member 51. Each intermittent clutching action of the balls 16 with the cammed member 27 results in a transfer of power between the members 11 and 7, and each transfer of power reduces the torque and thereby the relative speed of the said members. When the relative speeds have been sufficiently reduced due to a series of successive transfers of power the resisting member 51 will then be able to hold the balls 16 continuously in operative clutching position as described for the operation of the means of Figure 1, and with the same results.

The ball will always start its continuous clutching action when a given torque is attained between the members 11 and 7, and a variation of the resisting ability of the annular member 51 will of course change the torque value at which the said operation starts.

The balls 16—A and 16—B of Figure 8 constitute means for effecting unidirectional clutching action of the clutch rollers 19 and 24. The balls 16—A and 16—B also effect unidirectional control so that the rollers 19 and 24 will be controlled by the position of the shiftable member 33 to become unidirectional clutch rollers and thereby provide selective free-wheeling action for direct and intermediate speeds.

In normal forward drive operation the control member 33 in its movement to the left from neutral position depresses the ball 16—A and thereby the ball 16—B to ride in the cammed tracks 38 and 47 of the member 27, or similar cammed tracks formed in the said member.

With the member 11 rotating faster than the roller control member 27 in a clockwise direction as indicated by the upper arrow, and with the ball 16—A depressed the ball 16—B is actuated to be moved by the member 27 so as to tend to take its place under the ball 16—A and thereby clutch the members 11 and 27 to clutch the members 11 and 7, and to also connect the members 11 and 7 as hereinbefore described.

As the member 6 and therefore the cammed member 27 tends to rotate faster in the same clockwise direction than the member 11 the ball 16—B will be moved by the tracks 38 and 47 of the member 27 to the position shown by Figure 8 and no clutching, or free-wheeling action will exist between the members 11 and 7 or 10 and 7 as a function of the axial position or movement of the slidable member 33. If the member 27 rotates counter clock-wise faster than the member 11 as indicated by the lower arrow the ball 16—B will be moved under the ball 16—A and thereby clutch the members 11 and 27 to cause one to drive the other.

With a second set of control balls 17—A and 17—B (not shown) placed in the path of the slidable member 33, free-wheeling action may be obtained for intermediate speed. In normal operation, it is assumed that free-wheeling action will only be desired for direct drive conditions.

While I have shown and described and have pointed out in the annexed claims certain new and novel features of my invention, it will be understood that certain well known equivalents of the elements illustrated may be used, and that various other substitutions, omissions and changes in the form and details of the device illustrated may be made by those skilled in the art without departing from the spirit of the invention which is indicated in the following claims.

Having thus described my invention, I claim:—

1. A device for resiliently and positively connecting driving and driven clutch members according to the extent and direction of the torque relations of same, comprising associated reversible unidirectional clutches each with an intermediate fully released position, resilient bidirectional camming means for normally restraining said clutches in said fully released position, said camming means energized by power derived from relative motion of the said members for moving the clutches into and out of the restrained position, means for deriving the said power from one of the driving members and the driven member and means for selectively controlling the power deriving means and therewith the moving action of the said camming means.

2. In a device of the class described, the combination with driving and driven clutch members, said driven member having a plurality of cammed surfaces, clutch rollers co-operating therewith to act as reversible unidirectional clutches each with an intermediate fully released position, means in the path of the rollers to normally prevent the clutching action thereof, resilient torque actuated camming means associated with the members and preventing means for positively moving said clutch rollers and clutch members into and out of a clutching position, and means for effecting said association and thereby selectively controlling the torque actuated means.

3. In a device including driving and driven clutch elements, movable clutch roller means for connecting and disconnecting the said elements, camming means including give-away stop elements actuated by certain relative rotation of the driving and driven elements thereby to positively move the clutch rollers to and from the said connecting and disconnecting positions, and a selector to control the give-away stop elements and thereby the camming means.

4. In a device of the class described, the combination of a plurality of axially fixed driving elements each formed with a cylindrical clutching surface and an axially fixed driven element formed with a plurality of clutching surfaces, a plurality of reversible unidirectional clutch rollers designed to be positively moved to effect a plurality of speed driving relations between said driving elements and the driven element and to disconnect the said driving relations, clutch roller control means designed to be actuated by power derived from the relative rotation of one of the driving elements and the driven element, means for initiating the power derivation including give-away stop elements for delaying the actuation of the roller control means, shiftable control means for selectively actuating the delaying means, and a common control means for selectively operating the shiftable means.

5. The combination of a power transmission including a pair of axially fixed power members, one of said power members including a plurality of speed driving elements each provided with a clutching surface, the other power member including a driven element having a plurality of clutching surfaces, reversible unidirectional clutch portions each with an intermediate fully released position supported by the driven element and adapted to be positively moved in two directions from a normally restrained position to establish a plurality of drive relations between said members, and in two directions from operative positions to prevent driving relations, said clutch moving portions including camming means actuated by power derived from the relative rotation of the power members, control means for causing the camming means to inaugurate the power derivation from the said power members, and a common selector for the camming control means.

6. A clutch device for connecting either of a pair of driving members each provided with a clutching surface with a driven member provided with a plurality of clutching surfaces, comprising reversible bidirectional clutch rollers formed for co-operative association therewith, bidirectional clutch actuating resilient camming means energized by power derived from the relative rotation of certain of the members, means for deriving the said power, means for effecting the said derivation, shiftable means for selectively controlling the effecting means, and a selector for moving the shiftable means.

7. A device for associating driving and driven clutch members in a plurality of drive relations, comprising clutch rollers arranged for clutching association therewith, bidirectional resilient camming means actuated by power derived from one of the driving members and the driven member for positively controlling the clutch rollers from, to, and at clutching positions, resilient give-away stop means for deriving the said power, a movable member for causing the said derivation, and a selector for controlling the movable means.

8. In a device of the class described, a pair of driving members each provided with a clutching surface and a driven member provided with a plurality of clutching surfaces, a plurality of sets of clutch rollers positioned for co-operative association therewith, power actuated camming means for bidirectionally moving selected rollers means as a function of the torque relations of one of the driving members and the driven member, means for intermittently deriving the said power from the selected members, means for initiating the operation of the intermittent means, and a selector for selectively controlling the initiating means.

9. In a device of the class described, means including two driving clutch members and a driven clutch member, a plurality of clutch rollers co-operatively associated with the said members, power actuated means for controlling the said co-operative association, said power actuated means including a plurality of bidirectional cam sets and a common resilient element positioned therebetween to absorb power therefrom and to return said power thereto, means for associating one of the elements of one of the cam sets with one of the driving members and the other element of the cam set to the driven member to obtain the said power therefrom, means for causing the said association, and a selector for selectively controlling the causing means.

10. A clutch device for coupling either of a pair of driving members each formed with a clutching portion with a driven member formed with a plurality of clutching portions, comprising clutch rollers arranged for clutching engagement therewith, interlocked reversible unidirectional torque actuated camming means for positively effecting the said engagement, means for obtaining the said torque from one of the driving members and the driven member, axially movable means for permitting the torque obtaining action, and a control for the movable means.

11. A device for placing driving clutch members and a driven clutch member into and out of a plurality of speed drive relations, constituting gripping members in the form of rollers carried by the driven member for co-operative association therewith, means including bidirectional cam sets and a common associated resilient element energized by power taken from one of the driving members and the driven member for positively moving and holding the said rollers, means for causing the bidirectional means to take the said power from the said members, means for initiating and maintaining the causing action, and means for controlling the causing action selectively through the operation of the initiating means, said resilient element designed to exchange power with the cam sets as a function of the torque relations of one of the driving members and the driven member.

12. A clutch device for positively connecting and disconnecting driving members each including a clutch surface and a driven member including a plurality of clutch surfaces, including clutch rollers positioned between the said members for clutching association therewith, means including cam sets each including an element positioned on the driven member for rotation therewith and an element for moving the clutch rollers, said cam sets actuated by power taken from one of the driving members and the driven member, a power absorbing and exchanging element positioned for common association with the said cam sets, means for obtaining the said power for the said cam sets and said power element from the said members, and means for selectively controlling the said power obtaining action, said power element receiving power from the cam sets and delivering power to the same as a function of the torque relations of the said driving members and the driven member.

13. A device for resiliently and positively coupling and uncoupling driving clutch elements and a driven clutch element as a function of the torque relations of the said elements, comprising roller clutch elements mounted for clutching association therewith during intervals of excessive torque, power actuated camming means for effecting said association, common resilient means for taking and storing the said power from one of the driving elements and the driven element and subsequently returning the said power to the said elements, and means for causing the said taking action.

14. A device for initially connecting driving clutch members and a driven clutch element into a plurality of resilient speed drive relations and to permit each resilient speed relation to become a positive drive relation during intervals of excessive driving torque, interlocked resilient power actuated camming means for effecting said speed relations according to the torque relations of one of the driving members and the driven member, slip-clutch means for obtaining the actuating power from the said selected members, and means for controlling the power obtaining means.

15. In a device of the character described, the combination with driving and driven clutch members, interlocked torque actuated camming means for resiliently connecting either of the driving members with the driven member, said actuating torque automatically obtained from one of the driving members and the driven member and stored and returned to same as a function of the torque relations of same, and means for controlling said torque obtaining action.

16. A device for connecting driving members each with a clutching surface and a driven member with a plurality of clutching surfaces, gripping members in the form of rollers co-operating therewith to act as clutches, resiliently associated interlocked bidirectional camming means actuated by virtue of the relative rotation of either of the driving members and the driven member for causing the gripping members to connect said driving member and the driven member and thereafter to disconnect the members due to power stored during the connecting period, and means for permitting the relative movement of either of the driving members and the driven member to cause the said actuation and the said storage of power.

17. In a roller clutch type transmission including driving and driven clutch members and relatively movable roller clutch elements therebetween for co-operative association therewith, a plurality of resiliently associated interlocked cam sets actuated by power received from one of the driving members for moving the clutch rollers according to the torque of the said driving member, means for obtaining the actuating power from the said driving member, and a control means for said power obtaining means, one element of each of the cam sets positioned on the driven member for rotation therewith and the other element of each cam set loosely mounted on the said driven member.

18. A device for resiliently and positively connecting a driving member and a driven member each forming a portion of a clutch organization, including clutch rollers for co-operative clutching association therewith, power actuated means for continuously controlling the said association, resilient camming means for continuously deriving, storing and returning the said power during a given connection as a function of the relative rotation of the members, means for selectively controlling the power deriving means, and means for moving the selectively controlled means.

19. In a device of the class described, the combination of a plurality of axially fixed driving elements each formed with a cylindrical clutching surface and an axially fixed driven element formed with a plurality of clutching surfaces, a plurality of clutch rollers designed to be moved in two directions from a normally restrained position to co-operate with said elements, means including power actuated interlocked cam sets and a compressible member for moving certain of the said rollers as other rollers are restrained, means for obtaining the actuating power from one of the driving elements and the driven element, and a common control means designed to selectively actuate the power obtaining means according to the extent and direction of its movement along a given path.

20. In a reversible unidirectional resilient drive transmission including a plurality of axially fixed driving members and an axially fixed driven member, a plurality of axially fixed driven member clutch roller means for selectively causing the said members to assume the said drive relations when moved relative thereto, torque actuated means for receiving power from one of the driving members and the driven member for moving the said rollers according to the torque relations of the said members, means for deriving the said power from the said driving member and the said driven member, movable means for controlling the said power deriving means whereby the torque actuated means will selectively hold or move the rollers to a resilient speed drive relation and thence to a positive speed drive relation.

21. In a device of the class described, the combination of a plurality of axially fixed driving elements each formed with a cylindrical clutching surface and an axially fixed driven element formed with a plurality of clutching surfaces, a plurality of clutch rollers designed to be moved in two directions from a normally restrained position to co-operate with the said elements, means including power actuated interlocked cam sets for positively moving certain of the said rollers into a clutching position, said power actuated means including power absorbing means arranged to become actuated to positively move the certain said rollers out of a clutching position, means for obtaining the said actuating power from one of the driving members and the driven member, a common control means for selectively controlling the power obtaining means according to the extent and direction of its movement along a given path, and a selector for moving the common control means.

22. A clutch device for connecting either of a pair of driving clutch members with a driven clutch member, including a plurality of gripping members co-operating therewith to effect a plurality of speed driving relations, means actuated by power derived from one of the driving clutch members and the driven clutch member for positively moving the gripping members to approach a gripping position, said power actuated means including a power absorbing element positioned to become active as a function of the torque relations of the driving clutch members and the driven clutch member to move the gripping members to an inactive position, means for obtaining the actuating power from one of the driving clutch members and the driven clutch member including a second named set of gripping members, a control member for selectively controlling the power obtaining means, and a selector for moving the control member.

23. A clutch device for positively connecting and disconnecting driving members each provided with a clutching surface and a driven member provided with a plurality of clutching surfaces, including reversible unidirectional gripping members with an intermediate fully released position co-operating therewith to act as clutches, torque controlled camming means for positively moving said gripping member into a clutching position, power actuated means co-operatively associated with the said camming means for positively moving the said gripping members out of a clutching position, means carried by the said driven member for obtaining said torque and thereby said actuating power from a selected driving member and said driven member, movable means for selectively controlling the power obtaining means, and an axially movable selector for moving the movable means.

24. In a device of the class described, the combination of two driving clutch members and a driven clutch member, rollers acting therewith to act as clutches, power actuated means for bidirectionally moving the rollers, means for taking the actuating power from one of the driving members and the driven member, said power taking means including cam sets each provided with a clutching surface and mating cam surfaces, a power absorbing member positioned between the cam sets for exchanging power therewith, a slidable member formed with two cam clutching surfaces, gripping members positioned between the cam sets and the slidable member and rotatable with the driving members, and a selector for moving the slidable member to and from a clutching engagement with the gripping members.

25. A clutch device for associating driving members and a driven member in a resilient drive relation, comprising normally restrained camming means co-operatively associated therewith, power actuated means for removing said restraint and thence actuating said cams as a function of the torque relations of one of the driving members and the driven member, over-running clutch means for obtaining said actuating power from one of the said driving members and the driven member, an axially movable member for selectively controlling the obtaining means, and a selector for operating the movable means.

26. In a multi-speed resilient clutch device including a plurality of driving members, a driven member and associated clutch elements positioned between the driving and driven members, power actuated interlocked camming means including a power absorbing and exchanging element arranged to become active as a function of the torque relations of one of the driving members and the driven member, and over-running clutch means associated with one of the driving members and the camming means for obtaining the actuating power from the said driving member and the driven member, means for initiating and maintaining the said obtaining action thereby to effect the said association, and means for controlling the initiating means.

27. In a multi-speed clutch organization including a plurality of driving members with clutching portions, a driven member with a plurality of clutching portions, and a plurality of sets of associated clutch rollers, intermittent over-running clutch power actuated camming means including a power actuated spring positioned between said camming means, said spring arranged relative to the said camming means so as to become a power exchanging device as a function of the torque relations of one of the driving members and the driven member, and clutching means carried by the camming means and positioned by the said driving members, said clutching means controlled by a shiftable member carried by the driven member and rotatable therewith to obtain the said actuating power.

28. In a multi-speed roller clutch organization including a plurality of associated driving members and a driven member, power actuated camming means for causing the said rollers to selectively associate the said members in a plurality of speed drive relations, a common power exchanging means co-operatively associated with the power actuated means, said power exchanging means arranged to receive power from the power actuated means during the interval of moving the rollers into an associated clutching position for thereafter disassociating a driving member and the driven member, over-running clutch means for obtaining the said actuating power, and a control for the said obtaining means.

29. A clutch device for resiliently connecting either of a pair of driving members with a driven member, including a power actuated camming set positioned between each driving member and the driven member, a plurality of sets of gripping members, each gripping set co-operatively associated with a cam set, a driving member and the driven member, means constituting a shiftable member for selectively causing the gripping members to assume a gripping position between a selected cam set, a driving member and the shiftable member to derive the actuating power for the cam set, a common power exchanging element positioned between the cam sets for selective exchange of said power, said power exchange occurring as a function of the torque relations of the said driving member and the driven member, and means for moving the shiftable member relative to the driven member as it rotates therewith.

30. A multi-speed resilient-positive drive power transmission device including a plurality of driving members and a driven member concentrically arranged, a plurality of symmetrically disposed gripping members carried by the driven member and movable relative thereto for co-operative gripping association with the said driving members, a slidable member provided with a plurality of clutching surfaces and mounted on the driven member for rotation therewith, a plurality of interlocked cam sets carried by the driven member and including a cam element rotatable with the driven member, a common power storing member carried by the driven member and positioned between said cam sets to selectively exchange power therewith as a function of the torque relations of one of the driving members and the driven member, means for moving the slidable member, and means for co-operatively associating a cam element, a driven member and the slidable member to obtain power from the said driving member and the driven member.

HOWARD J. MURRAY.